United States Patent [19]

Kelley et al.

[11] 4,430,392
[45] Feb. 7, 1984

[54] HEAT ACTIVATED VENT

[75] Inventors: John A. Kelley, Willingboro, N.J.; Curtis A. Michener, Hatfield, Pa.

[73] Assignee: Honeywell Inc., Minneapolis, Minn.

[21] Appl. No.: 465,723

[22] Filed: Feb. 11, 1983

[51] Int. Cl.³ .............................................. H01M 2/12
[52] U.S. Cl. ....................................... 429/53; 429/56; 137/68 R; 137/70; 220/202
[58] Field of Search ................. 429/56, 53; 137/68 R, 137/69, 70, 72, 73, 76, 457; 220/202

[56] References Cited

U.S. PATENT DOCUMENTS 1,891,188 12/1932 Rowley ................................ 137/72
3,008,479 11/1961 Mancusi .............................. 137/72
4,409,151 9/1977 Thibault .............................. 429/56

FOREIGN PATENT DOCUMENTS 1076494 7/1967 United Kingdom ................ 220/201

Primary Examiner—Donald L. Walton
Attorney, Agent, or Firm—Mitchell J. Halista; Trevor B. Joike

[57] ABSTRACT

The heat activated vent for releasing an excess internal pressure in a container which pressure accompanied by an abnormal rise in an internal temperature of the container uses a spring to store sufficient energy to propel a barb or spike to pierce a thin diaphragm. A pierceable thin diaphragm is positioned adjacent to the sharp end of the barb and is arranged to provide a fluid tight seal across an open end of a hollow vent housing. The spring is in the form of a leaf spring having a diaphragm piercing upright barb at one end thereof while the other end of the leaf spring is supported in a fixed position within the housing. The end of the spring carrying the barb is normally retained in a position wherein the barb is spaced from the diaphragm by a preshaped end of a cantilevered beam of a material having a memory capability. A temperature rise of the container is communicated to the vent housing which, in turn, is effective to produce a temperature rise of the memory material to allow the memory material to return to its original shape. The original shape of the memory material is effective to release the barb carrying end of the leaf spring to allow the spring to propel the diaphragm piercing barb into the diaphragm to produce a hole in the diaphragm for releasing the internal pressure in the container into a fluid escape channel from the vent housing.

10 Claims, 2 Drawing Figures

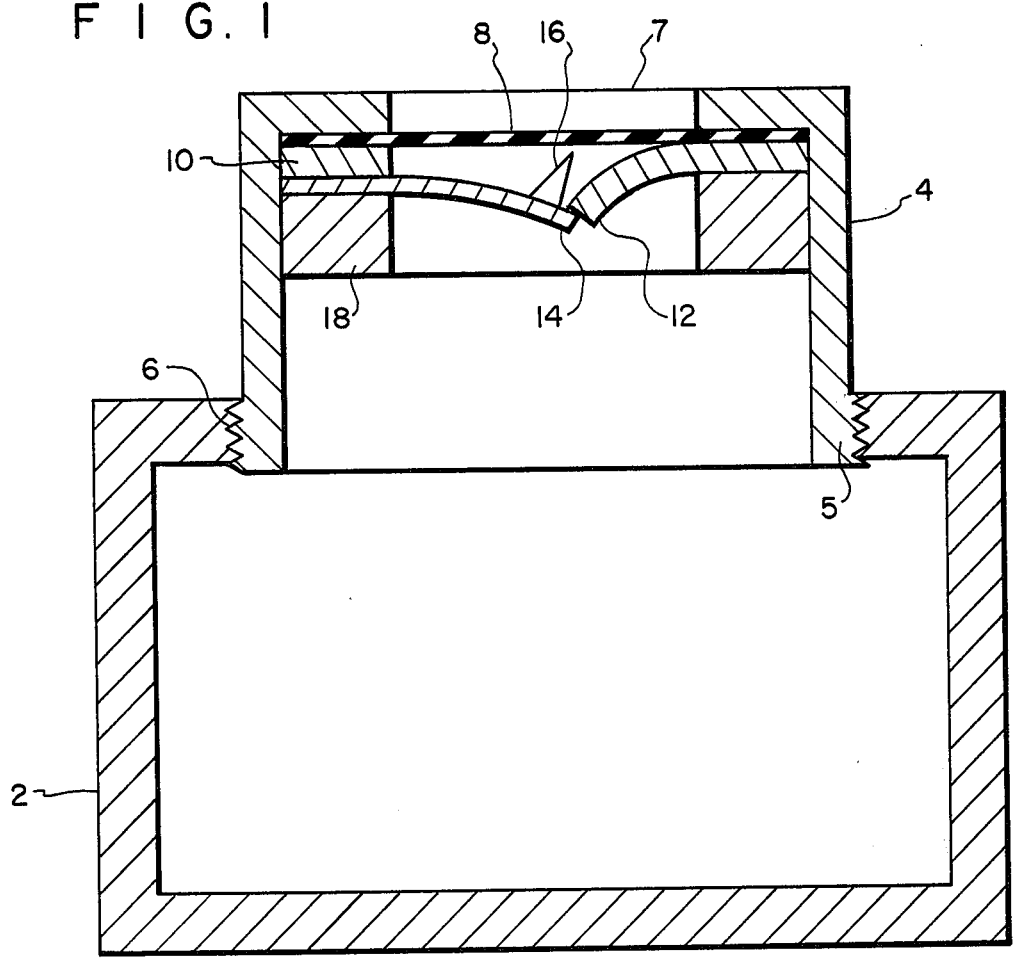
F I G. 1
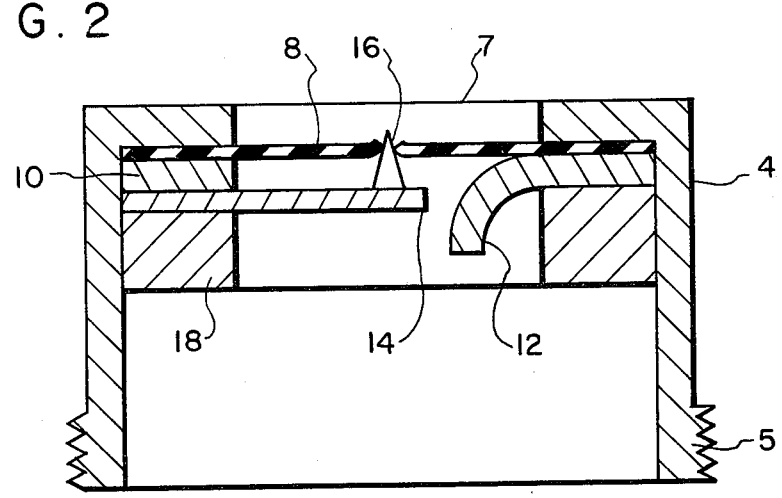
F I G. 2

HEAT ACTIVATED VENT

BACKGROUND OF THE INVENTION

Field Of The Invention

The present invention relates to vents. More specifically, the present invention is directed to a heat activated vent.

SUMMARY OF THE INVENTION

An object of the present invention is to provide an improved heat activated vent.

In accomplishing this and other objects, there has been provided, in accordance with the present invention, a heat activated vent having a housing means with a fluid passage therein, a diaphragm arranged to seal the fluid passage in the housing means, a diaphragm piercing means in the housing means, spring means for urging the piercing means into the diaphragm and temperature responsive means for spacing the piercing means from the diaphragm in opposition to the spring means below a predetermined temperature of the housing means, the temperature responsive means including a memory material element having a first shape for opposing the spring means below the predetermined temperature to space said piercing means from said diaphragm means and a second shape for releasing the spring means above the predetermined temperature.

BRIEF DESCRIPTION OF THE DRAWINGS

A better understanding of the present invention may be had when the following detailed description is read in connection with the accompanying drawings, in which:

FIG. 1 is a cross-sectional illustration of a heat activated vent embodying an example of the present invention and FIG. 2 is a cross-sectional illustration of the heat activated vent shown in FIG. 1 in a pressure venting state.

DESCRIPTION OF THE PREFERRED EMBODIMENT

Detailed Description

Referring to FIG. 1 in more detail, there is shown a container 2 for containing an internal pressure which is to be released during an excess pressure condition by the heat activated vent of the present invention. While the present invention is useful in many applications, the container 2 may, for example, be a battery such as a lithium battery which has a working pressure within the battery and an overload pressure produced during a battery abuse operation which overload pressure must be vented to prevent an explosion of the battery container. The excessive rise in internal pressure within the battery is accompanied by an abnormal rise in the internal temperature of the battery and the temperature of the container 2. A hollow vent housing or cap 4 has an externally threaded first end 5 for mounting the cap 4 into a threaded opening 6 in the container 2. A hole 7 is provided in a second end of the vent housing 4. A pierceable thin diaphragm 8 is located within the housing 4 and is positioned across the hole 7 to provide a fluid tight seal across the hole 7.

A spacer ring 10 is arranged to capture the diaphragm 8 against an internal end wall of the cap 4 to maintain fluid tight seal of the diaphragm 8 across the hole 7. A portion of a radially inward side of the ring 10 is extended to form a first cantilevered beam 12. The material of the ring 10 is an alloy having a "memory" capability, e.g., the alloy identified as Nitinol and which is discussed in U.S. Pat. No. 3,748,108. Other memory type materials are discussed in U.S. Pat. Nos. 3,802,930 and 3,832,243. Such materials can be preformed into a shape which is retained below a critical temperature. The critical temperature is arranged to be above the normal temperature of the vent 4. Above the critical temperature, the memory material returns to its original or "memory" shape. In the structure of the present invention the cantilevered beam 12 has a preformed shape which is effective to position the cantilever 12 spaced from the adjacent surface of the diaphragm 8 and a "memory" shape wherein the cantilever 12 is bent still farther away from the diaphragm 8.

A strip of spring steel is used to form a second cantilevered beam 14. One end of the second cantilevered beam 14 is positioned against the ring 10 at a area diametrically opposite to the cantilevered beam 12 while the free end of the second cantilevered beam 14 is contacted by the free end of the memory material cantilver 12. Thus, the free ends of the cantilevers 12 and 14 form an approximate arch above the diaphragm 8 in a preformed state of the first cantilever 12. A diaphragm piercing upright barb 16 is located on the free end of the second beam 14 adjacent to the contact area between the first beam 12 and second beam 14 with a pointed end of the barb 16 facing the diaphragm 8. The pointed end of the barb 16 is spaced from the diaphragm 8 by the restraining action of the memory material beam on the free end of the spring beam 14 during a normal temperature operation of the vent which, as previously mentioned, is below the critical temperature of the memory material.

A retaining ring 18 is positioned within the housing 4 to capture the spacer ring 10 and the second cantilever 14 against the diaphragm 8 to retain those elements in a predetermined layered relationship and to assist in effecting the leak proof seal afforded by the housing 4 during a normal temperature operation of the vent. An abnormal temperature rise of the container 2 accompanied by an excess internal pressure is transmitted to the vent cap 4 heat the memory material 12 past its critical temperature. Such a temperature rise is effective to produce a temperature induced motion of the memory material beam 12 into its memory state. Specifically, this motion is effective to return the memory material beam 12 to a position farther away from the face of the diaphragm 8 as shown in FIG. 2. When the end of the beam 12 is free of the end of the spring beam 14, the spring beam 14 is released and is allowed to propel the barb 16 into the diaphragm 8 to produce a piercing of the diaphragm 8 as also shown in FIG. 2. This piercing of the diaphragm 8 is effective to release the excess pressure within the container 2 into a fluid escape channel leading out the vent housing 4 through the hole 7.

Accordingly, it may be seen that there has been provided, in accordance with the present invention, an improved heat activated vent.

The embodiments of the invention in which an exclusive property or privilege is claimed are defined as follows:

1. A vent comprising:
  a vent housing means having a fluid passage therein,
  a diaphragm means for sealing said passage, diaphragm piercing means within said housing, spring means for urging said diaphragm piercing means into said diaphragm and heat responsive means for spacing said diaphragm piercing means from said diaphragm means in opposition to said spring means below a predetermined temperature of the housing means and for allowing said spring means to propel said diaphragm piercing means into said diaphragm above said temperature, said heat responsive means including a memory material element having a first shape for restraining said spring means below said temperature to space said piercing means from said diaphragm means and a second shape above said temperature for releasing said spring means.

2. A vent as set forth in claim 1 wherein said diaphragm piercing means includes an upright barb having its pointed end facing said diaphragm and said spring means includes a spring steel cantilever beam having a fixed end within said housing and a free end carrying said barb.

3. A vent as set forth in claim 2 wherein said memory material element is arranged in the form of a ring having a portion of a radially inward side forming a second cantilevered beam having a free end abutting said free end of said spring steel cantilevered beam.

4. A vent as set forth in claim 3 wherein said diaphragm means includes a pierceable thin diaphragm and said ring of said memory material is arranged to capture said diaphragm in said housing means to seal said passage.

5. A vent as set forth in claim 4 wherein housing means includes a retaining ring arranged to capture said spring steel beam and said ring of said memory material in said housing means.

6. A vent as set forth in claim 5 wherein said retaining ring and said ring of said memory material are coaxial.

7. A vent as set forth in claim 1 wherein said memory material element is made of Nitinol.

8. A vent as set forth in claim 3 wherein said ring is made of Nitinol.

9. A vent as set forth in claim 1 wherein said vent housing means includes a hollow vent housing having a first threaded end for attaching said vent housing means to a container and a second end having a hole sealed by said diaphragm means.

10. A vent as set forth in claim 4 wherein said vent housing means includes a hollow vent housing having a first threaded end for attaching said vent housing means to a container and a second end having a hole sealed by said diaphragm.

* * * * *